4 Sheets—Sheet 1.
T. HYATT.
Assignor to E. A. L. HYATT, (Late E. A. LAKE.)
Illuminated Basements, Basement-Extensions, Sidewalks, Roofs, &c.
No. 8,363. Reissued Aug. 6, 1878.
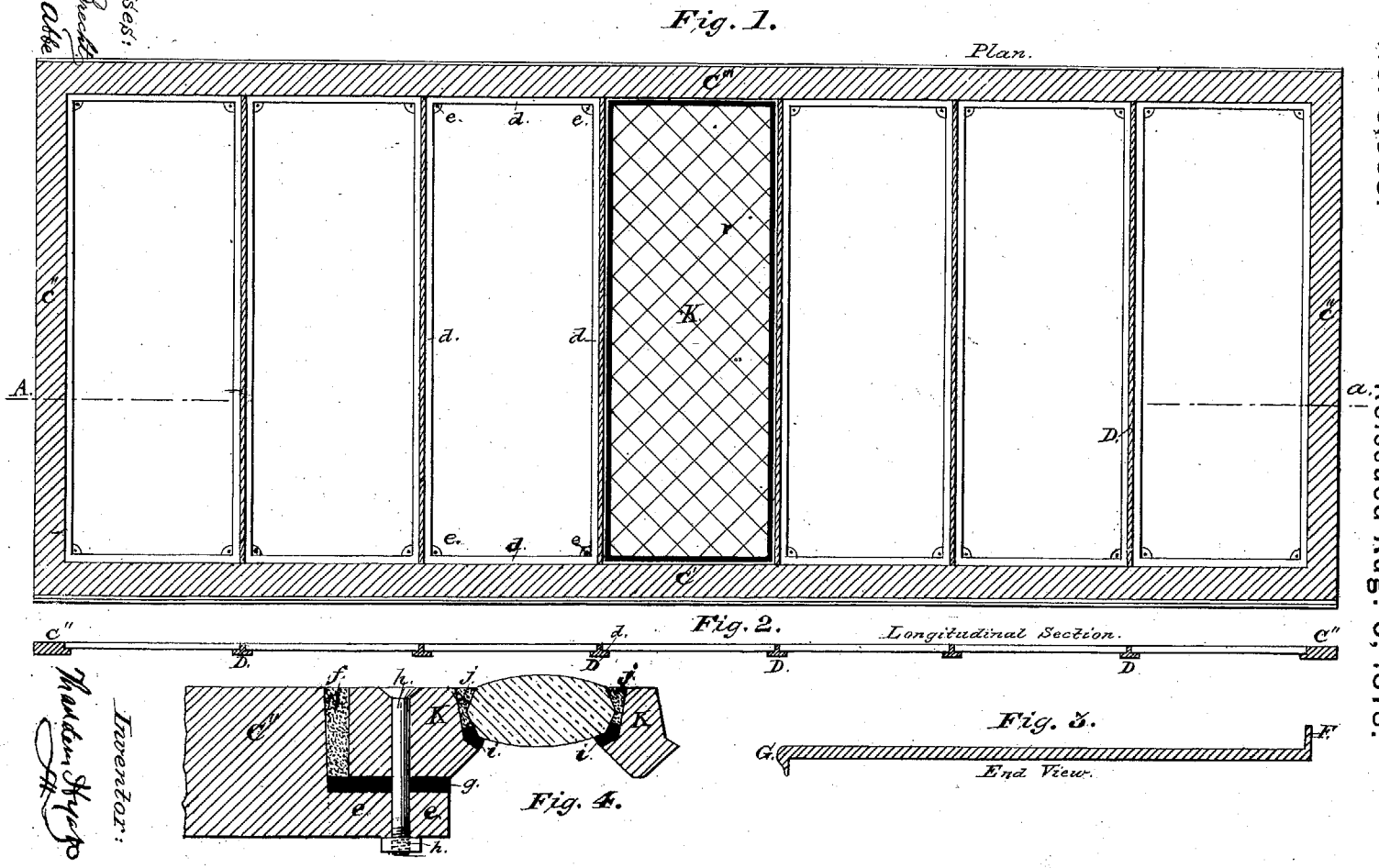
Witnesses:
T. C. Brecht
Chas. C. Abbe
Inventor:
Thaddeus Hyatt

T. HYATT.
Assignor to E. A. L. HYATT, (Late E. A. LAKE.)
Illuminated Basements, Basement-Extensions, Sidewalks, Roofs, &c.
No. 8,363. Reissued Aug. 6, 1878.
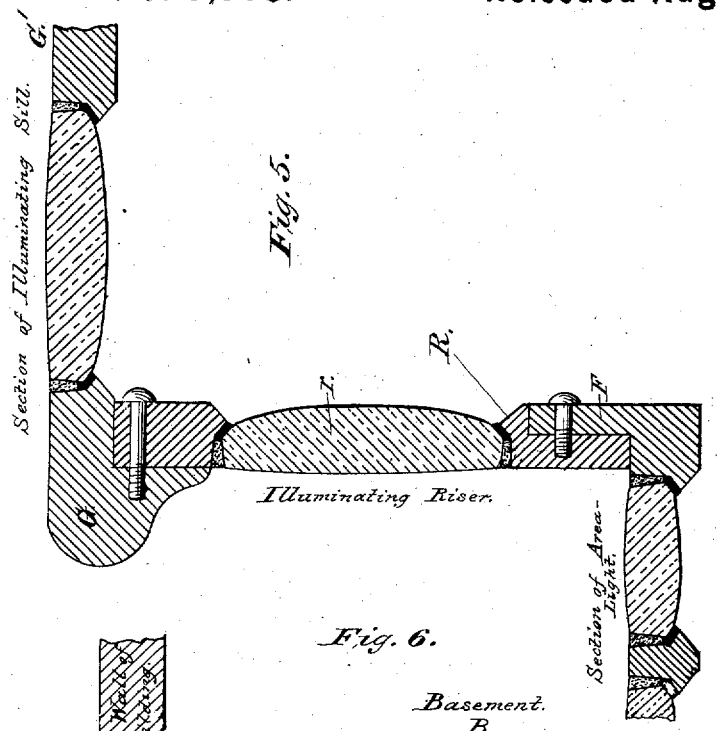
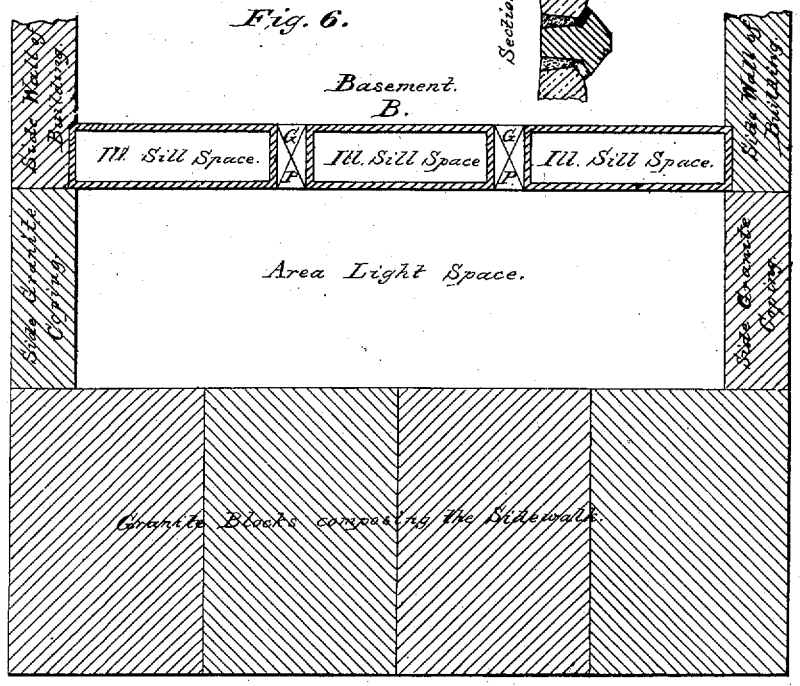
Witnesses:
T. C. Brecht
Chas. C. Abbe
Inventor:
Thaddeus Hyatt
THE NORRIS PETERS CO., WASHINGTON, D. C.

4 Sheets—Sheet 3.
T. HYATT.
Assignor to E. A. L. HYATT, (Late E. A. LAKE.)
Illuminated Basements, Basement-Extensions, Sidewalks, Roofs, &c.
No. 8,363. Reissued Aug. 6, 1878.
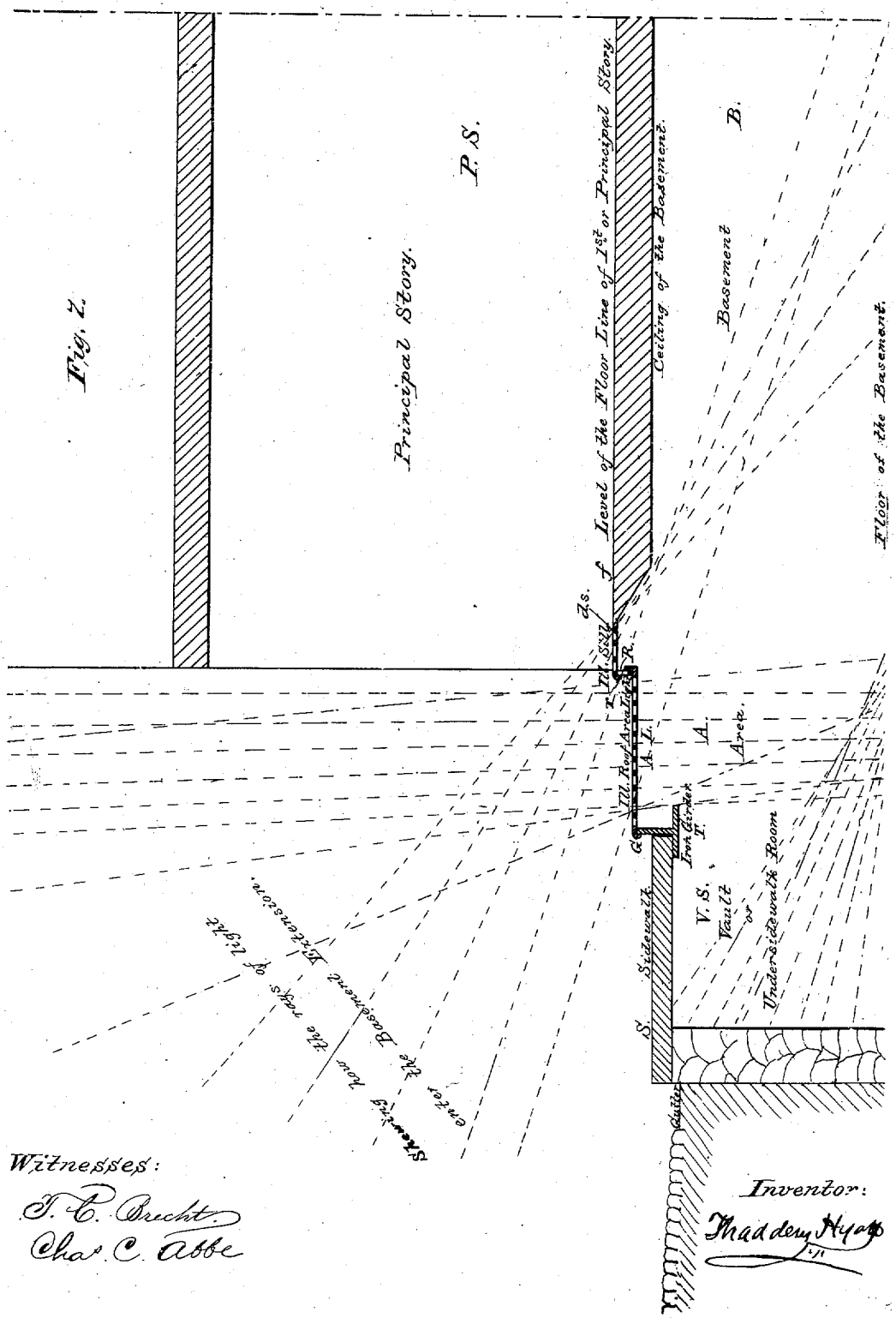
Witnesses:
T. C. Bricht
Chas. C. Abbe
Inventor:
Thaddeus Hyatt
THE MORRIS PETERS CO., WASHINGTON, D.C.

T. HYATT.
Assignor to E. A. L. HYATT, (Late E. A. LAKE.)
Illuminated Basements, Basement-Extensions, Sidewalks, Roofs, &c.
No. 8,363. Reissued Aug. 6, 1878.
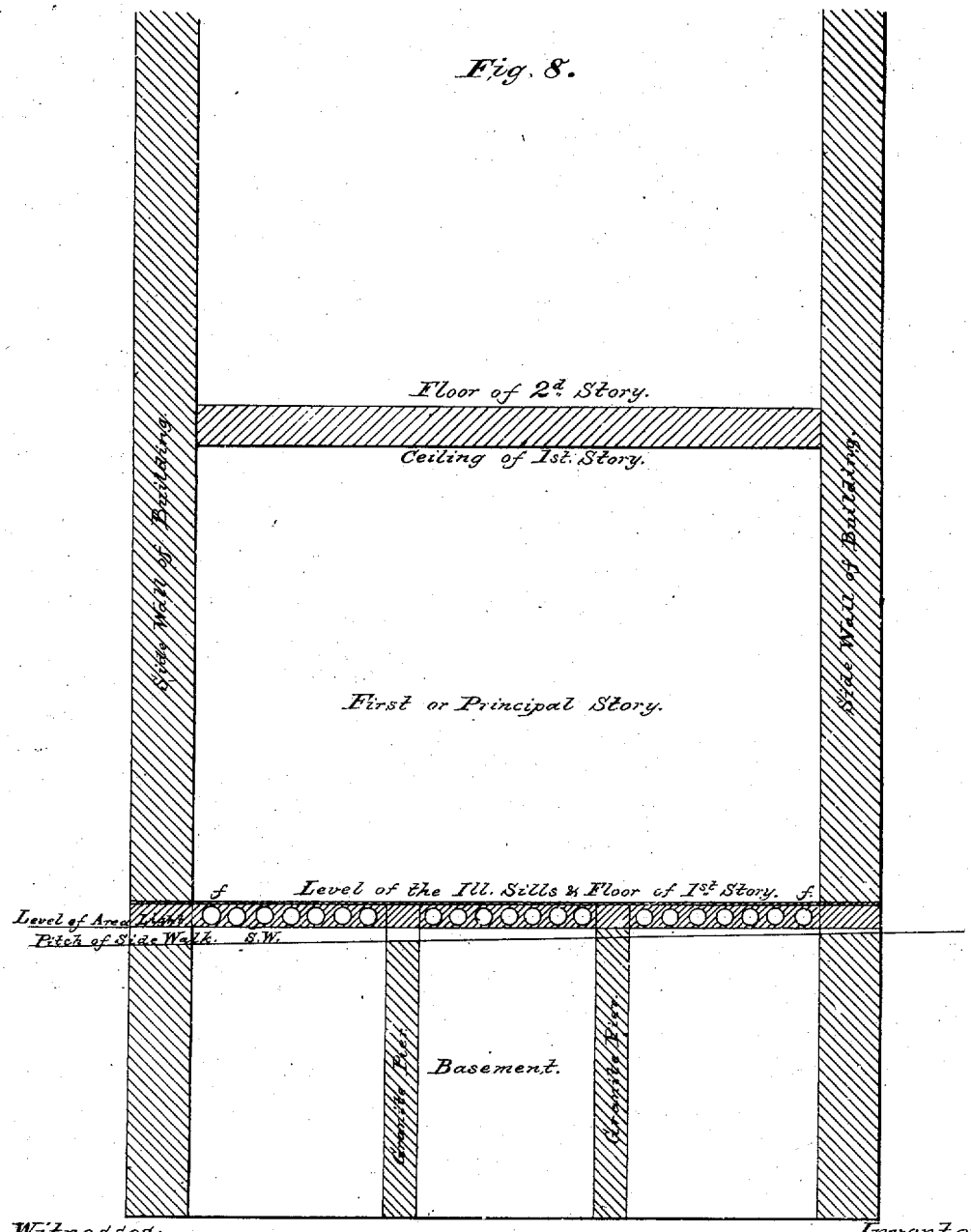
Witnesses:
T. C. Brecht
Chas. C. Abbe
Inventor:
Thaddeus Hyatt
THE NORRIS PETERS CO., WASHINGTON, D. C.

UNITED STATES PATENT OFFICE.

THADDEUS HYATT, OF NEW YORK, N. Y., ASSIGNOR TO ELIZABETH ADELAIDE LAKE HYATT, (LATE ELIZABETH ADELAIDE LAKE,) OF SAME PLACE.

IMPROVEMENT IN ILLUMINATED BASEMENTS, BASEMENT-EXTENSIONS, SIDEWALKS, ROOFS, &c.

Specification forming part of Letters Patent No. 68,332, dated August 27, 1867; Reissue No. 8,363, dated August 6, 1878; application filed October 23, 1874.

*To all whom it may concern:*

Be it known that THADDEUS HYATT, of the city, county, and State of New York, formerly of Atchison, Kansas, did make certain new and useful Improvements in Illuminated Basements and Basement-Extensions, made by constructing and combining his patented illuminating vault-covers or equivalent combinations of glass and iron, in connection with supports and framing, so as to produce, by the combinations, roofs of such strength as to be suitable also to be used as sidewalks—that is to say, where the sidewalk serves the purpose of a roof to an underground apartment, the purpose of the invention, where the roof is thus employed, being to enlarge the basement by the addition of the space underneath the sidewalk, and to also get the benefit of its light as a reflecting-chamber, lighted, under such circumstances, by a flood of direct vertical light falling into it from the vault of heaven above it.

Another purpose of the invention, as will appear from an inspection of the drawings, is to obtain for the basement a large amount of direct light through the illuminating-roof at the doorways of the building, where the rays of light falling from the heavens enter the basement at various angles, as shown, the area-covering or illuminating-platform in some instances extending into the building at its own level, and forming a portion of the floor of the principal story, and in other cases being formed into illuminating-steps, either at its junction with the sidewalk or at the doorway of the building, one or more steps being employed, according to the height of the floor of the principle story above the sidewalk.

In the accompanying drawings, the floor-level of the principal story is represented as only two steps above the street-level, the step from the sidewalk to the platform being, for special reasons, represented as formed by the aid of a cast-iron beam, the web of which is employed to do the duty of a riser to the area-covering, the other step—viz., from the platform-level to the floor-level—being an illuminating-step, composed of an illuminating door-sill or tread and an illuminating-riser, as represented in the drawings.

His invention of an illuminating-roof, made upon the plan of an illuminating-grating, or the application of the principle of his patented vault-cover, has already proved itself so valuable as a protection against fire, in contrast with skylights, as to have induced the fire-insurance companies of New York to make special rates against skylights and in favor of his mode of construction, while the application of the principle of an illuminating-grating to the construction of steps and area-platforms as a means of lighting and enlarging the area of basements has added millions to the taxable property of all the large cities of the country.

His original invention of the illuminating-grating in the form of a vault-cover was the work of but a single instant of time. His invention of its application to the larger fields of usefulness herein described was the work of years.

His invention of the application of the illuminating-grating principle to the construction of sidewalks includes the area-covering in the form of the simple platform shown in Figs. 1, 2, 3, and 4, and also when constructed as a stoop—that is to say, with steps, as herein-above mentioned—the object of the invention being in part to change the use of the space underneath the sidewalks or footways of streets from dark damp coal-vaults to well-lighted and finished apartments, forming a portion of the basement itself. This purpose he effected mainly by the area, which, by the old method of construction, was a chasm to separate, but by his method became a bond to unite, the two.

By the old method of construction, as he found it, the basements of buildings stopped at the face-line of the building, the same as the story above it, facing the street, and, like it, was closed between the piers by doors and windows, the area being an open space. The space underneath the sidewalk was occupied as coal-vaults, and these vaults at the building side were bounded by the area-wall, the area itself being curbed upon its three open sides. The front curb or "coping" was usually of stone, from nine to twelve inches in width, the width of the area being limited by the perpendicular face of the curb or coping nearest the roadway. In seeking to obtain all the light possible for illuminating the basement, he conceived the idea of getting rid of the stone coping, in order to increase the width of the light-giving area of the illuminating-platform or area-cover. Fig. 7, which represents a sectional elevation of a building, shows the plan or method adopted by him to accomplish this purpose, where T is an iron girder, laid parallel with the face of the building, the web of which is made use of as a riser to the illuminating-roof over the area A. This roof, as represented, is a simple platform, with no illuminating-steps in front of it, because, as already remarked, he has represented a building where the "level of the floor line of the first or principal story" is so near the street-level as to require no steps except at the doorway. Moreover, his purpose in representing such a building construction is to illustrate a special mode of employing the web of a web-and-flange girder, to wit, as a curb to the area-space in place of a stone coping, in order to enlarge the light-space of the area, the gain in light by this mode being in some cases equal to twenty per cent. of the surface of the whole area. The illuminating-step at the doorway, composed of the illuminating-sill *d s* and the riser R, as shown in Fig. 7, (the construction of which is illustrated in Fig. 5,) illustrates his invention in this form and the mode of its application. Where these steps are employed within the building, as represented in Fig. 5, it is evident that the basement B may be made very much lighter by raising the floor-level, so as to employ several steps in place of one, as shown.

The invention of the granite roof or sidewalk S is not his in itself. It is his only as any other roof-sidewalk connected with the iron girder T and the illuminating area-covering to form the roof of an extended basement is his, as in the construction here shown.

The drawings on the four sheets attached to and making part of this specification represent the improved mode of constructing a building, by means of which the basement is made of nearly or quite equal value with the first or principal story, its superficial area being very considerably increased, and its light, as improved by him, being sufficient to make it available as a salesroom, whereas, previous to his improvement in its construction, it was but little else than a store-room, and lighted by gas.

Figs. 1, 2, 3, 4, 5, and 7 show the methods adopted by him in order to make the illuminating constructions called "illuminating platforms and steps," the union of which produces illuminating-stoops, and the parts of which are illuminating-tiles, such as K, Fig. 1, the connecting or foundation frame of the tiles being indicated by C′ C″ C‴ on Fig. 1, *d* being the rabbets or seats in the frame, in which the tiles rest, and *e* lugs cast on the same for convenience of bolting the tiles to, as shown in cross-section, Fig. 4, other features of his invention in the frame being the nosing G and the rising lip F. (Shown in Fig. 3.)

His invention of an illuminating-step is illustrated by Fig. 5, where G G′ is the tread or sill, a portion only of the tread being shown, and R is the riser, set with glasses *r*, the appearance of these risers under the door-sills of the main openings to the principal story of a building being shown by Fig. 8. Fig. 1 is a plan; Fig. 2, longitudinal section through A *a*. Fig. 3 is an end view. Fig. 4 shows a section of the frame C″, where the tile K K rests upon the putty or mastic bed *g*. *f f* show the vertical seams, the same being made water-tight by means of a fusible cement composed of coal-tar and sulphur. C′ C″ C″ C‴ represent the foundation or joining frame for uniting any number of tiles or illuminating-gratings, in order to form an illuminating-roof or an illuminating-roof pavement. This frame he sometimes preferred to cast either in detached pieces or in sections, for convenience of construction.

Between the tile K and the frame C″, Fig. 4, *g* represents the putty or mastic bed upon which K rests, and which is designed to make good any inequalities of surface in the metals. *f* is the vertical seam of fusible cement. *h h* are bolts to bind the tiles K to the bed-plate or joining frame. In the plan, Fig. 1, but one opening is represented as closed by tiles, and the glasses are shown in diamond shape; but they are usually made circular. F, Fig. 3, is the rising lip at the rear of the frame, (shown more clearly in Fig. 5,) to which the illuminating-riser R is bolted, as shown, and packed to make a water-tight joint.

All these details, trifling as they may appear, were found by him to be essential to the making of good work—that is, water-tight work—for the whole of his success at the beginning hinged on the one point of water-tight work. Property-owners and architects doubted, during some years of his experiments in the streets of New York, his ability to make water-tight illuminating-roofs of iron and glass capable of withstanding the contractions of winter, the expansions of summer, the foot-wear of the multitude, and the concussions and vibrations incident to the rough usage to which sidewalks are subjected in a great commercial city like New York. His invention, therefore, like some others where the testing had to be practically made by use in public, required years for its perfecting.

Fig. 6 represents a sidewalk in plan, S W, composed of four granite slabs, the area-light space being left uncovered. G P are granite piers between the openings at the face of the building, into which, upon rabbets, the frames that carry the illuminating-sills or treads are supported, as shown by the shaded border around the illuminating sill-spaces. Fig. 7 is a sectional elevation of a building, where A is the area-space under the area-light or illuminating-platform A L. V S is the vault-space under the sidewalk S W, now, by this construction, changed into a portion of the basement B, an iron girder, T, having been employed by him to carry the sidewalk S W and the illuminating-platform A L, in place of the old area-wall that formerly existed when the space V S was a vault. B is the basement; P S, the first or principal story above the basement; *d s*, the illuminating door-sill; *r*, the illuminating-riser under it, forming the illuminating door-step.

He has shown the girder T as a part of his invention laid as a curb to the area-light space, its web forming the riser of the platform; but it is evident that modifications of this plan are admissible and quite consistent with the principle of enlarging the area-light space by dismissing the old stone coping that formed the finish of the area-wall, the dismissal of the wall itself forming part of his invention as a means of extending the basement under the footway of the street.

The plan he has illustrated by the drawings attached hereto is a method well devised for a store-front twenty five feet wide; but there are corner buildings where modifications of this plan are sometimes desirable, where, in fact, he found it most convenient to place his iron girders at right-angles to the face of the building, resting them, by preference, upon the piers of the walls. In this case he formed the riser to the area-light platform of independent plates, which he bolted to the string-pieces that carry the platform, or form a portion of it as division-bars D; but the leading principles of construction are the same through all variations adopted by him in adapting his invention to the special localities where he employed it, viz., an illuminating-platform composed of iron and glass, connected, in some cases, with the footway by means of steps—thus a stoop—and in other cases forming a portion of the general footway by lying in the same level; illuminating risers, treads, and sills, forming steps, these steps, by their combinations, producing, in some cases, illuminating step-roofs, or a roof composed of steps, and combining the footway of the street or sidewalk with his light constructions as a roof by means of suitable girders, so as to dispense with area-walls, windows, and doors, and thus make one continuous apartment under both the building and the footway of the street, with the result of an amount of light in the basement never before attained, and with the further result of making such basements more healthy and fit for occupancy.

Having thus fully described his invention and shown some of the modifications that may be made in it without departing from its leading principles, what I claim, and desire to secure by Letters Patent, is—

1. An illuminating-roof constructed of iron and glass upon or according to the principle of an illuminating-grating, substantially as herein set forth.

2. Illuminating roofs constructed by forming illuminating gratings into panels or plates of suitable shapes, sizes, and proportions to be mechanically fitted for combination with each other, and combining the same by means of supports or framing, in connection with vertical and horizontal or bed-packing and bolting, substantially in the manner and for the purposes as herein set forth, and illustrated by the drawings.

3. Illuminating risers and treads, and illuminating steps composed of illuminating risers and treads, constructed of iron and glass according to the principle of an illuminating-grating, substantially as herein set forth.

4. Illuminating step-roofs constructed of illuminating risers and treads formed, shaped, and proportioned to be mechanically fitted for combination with each other, and combining the same by means of supports or framing, in connection with vertical and horizontal or bed-packing and bolting, substantially in the manner and for the purposes as herein set forth, and illustrated by the drawings.

5. Illuminating-stoops constructed of illuminating-platforms or flat surfaces, in connection with illuminating-steps constructed of iron and glass, substantially as herein set forth.

6. Illuminated basements and basements extended underneath the footway of a street by means of a flat roof or sidewalk, in connection with and by means of illuminating-gratings constructed and combined, substantially in the manner and for the purposes as herein set forth, and illustrated by the drawings.

In testimony whereof I have hereunto set my hand this 30th day of September, 1874.

ELIZABETH ADELAIDE LAKE HYATT.

Witnesses:

W. I. DIXON,

CHAS. D. BULLEY.